(Model.)
E. B. CUNNINGHAM.
BALING PRESS.
No. 268,001. Patented Nov. 28, 1882.
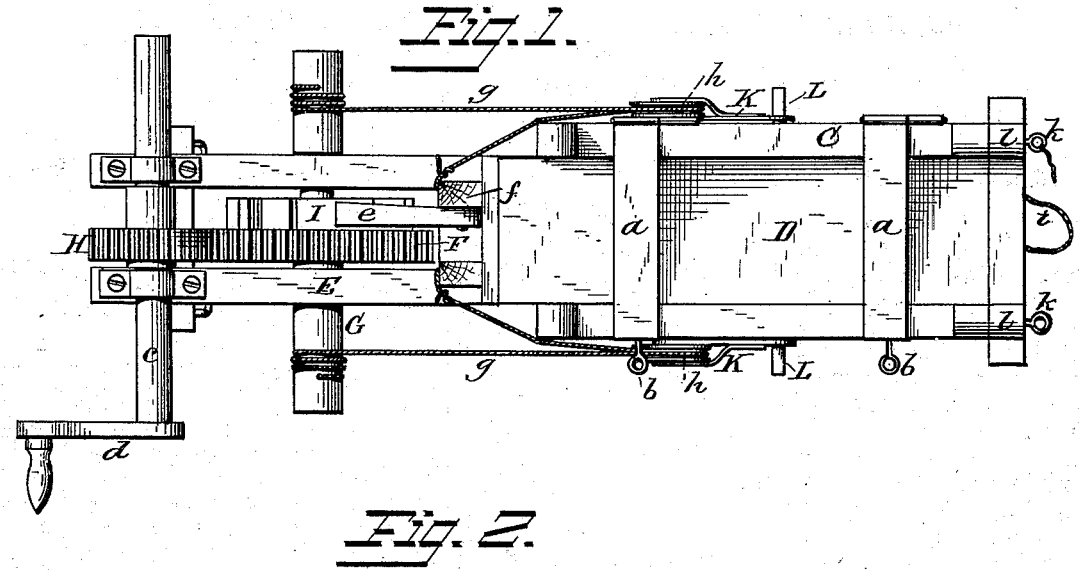
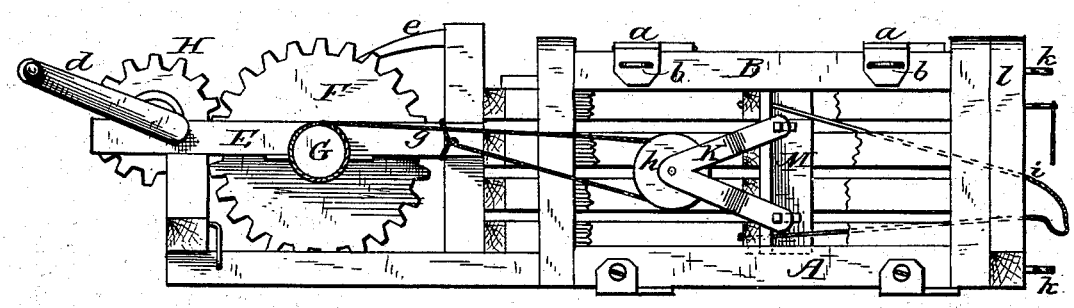
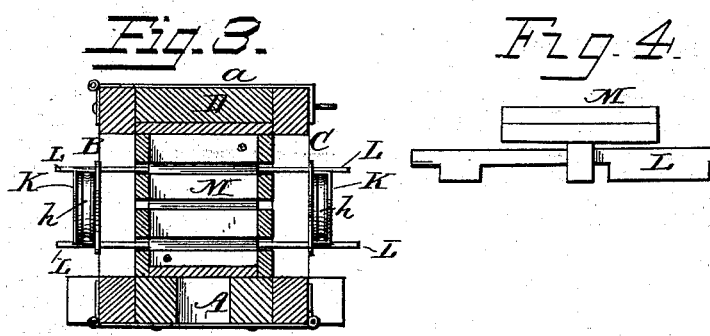
WITNESSES
Franck L. Durand
N. E. Oliphant
INVENTOR
Ephraim B. Cunningham
per Chas. H. Foster
Attorney

United States Patent Office.

EPHRAIM B. CUNNINGHAM, OF GAP CREEK, TENNESSEE.

BALING-PRESS.

SPECIFICATION forming part of Letters Patent No. 268,001, dated November 28, 1882.

Application filed April 13, 1882. (Model.)

*To all whom it may concern:*

Be it known that I, EPHRAIM B. CUNNINGHAM, a citizen of the United States, residing at Gap Creek, in the county of Knox and State of Tennessee, have invented certain new and useful Improvements in Hay-Presses; and I do hereby declare that the following is a full, clear, and exact description of the same, reference being had to the annexed drawings, making a part of this specification, and to the letters and figures of reference marked thereon.

Figure 1 of the drawings is a representation of a top plan view of my invention; Fig. 2, a side elevation, Fig. 3 a cross-section, and Fig. 4 a detail view, of follower, showing the sliding bar.

This invention relates to devices for compressing hay, straw, and other like substances into bales, and the objects thereof are to provide such a device as will be simple in its construction, effective in its operation, and capable of being readily removed from one place to another. These objects I attain by the construction substantially as shown in the drawings and hereinafter described.

In the accompanying drawings, A represents a stationary bottom, to which are hinged sides B C, the latter being also hinged to a top, D, which is fastened to the former by means of straps $a$, which aid to form the hinges, being bent down at right angles to fit thereon, and held securely in place by means of pins $b$. These hinged sides and top, together with the stationary bottom, form the baling-box in which the hay or similar substance to be compressed is placed.

To an extension of the stationary bottom A is fitted a suitable frame, E, for the purpose of supporting a windlass mechanism consisting of a large gear-wheel, F, upon a shaft, G, journaled in the frame, operated by a small gear-wheel, H, upon a shaft, $c$, meshing therewith, and driven by a crank, $d$, or other suitable means.

To the shaft G is also fitted a ratchet-wheel, I, working with a pawl, $e$, pivoted to an upright post, $f$, of the frame E. The ends of the shaft G extend outward from the frame a sufficient distance to admit of the winding of ropes $g$, having one end fastened thereto, and the free ends of said ropes passing around grooved pulleys $h$, journaled in removable stirrups K, connected to the ends of sliding bars L at the back of a follower, M, and secured to the frame. These bars L are made substantially of the form shown in Fig. 4, to admit of their sliding to and fro, for the purpose hereinafter described, said bars working on the slats of the sides B C.

When the hay or other similar substance is to be compressed the pawl $e$ is swung up and the follower M drawn back to the rear end of the baling-box by means of a cord, $i$, and the top D raised upon its hinges to allow of the box being filled. When a sufficient quantity of the loose substance has been placed in the box the top D is closed down and fastened by means of the pins $b$ and right-angle straps $a$ to the side B. The windlass mechanism above described is now operated, which causes the follower M to be brought with a regular pressure against the substance in the box toward the front end of said box, the amount of pressure being determined by the operator, and the follower is prevented from being forced back by the elasticity of the compressed substance by the pawl $e$ engaging with the ratchet-wheel I. The loose substance being now compressed into a bale, it is suitably tied, and the stirrups K, carrying the pulleys $h$ at the sides of the box, removed from the sliding bars L, said bars being pushed in toward the back side, C. The top is now released by the removal of the pins $b$, and the side B, by the removal of the pin $k$, passing through a hole in the upright post $l$ at the rear end of the stationary bottom A and entering the said side B. The bars L being pushed in clear of the side B, when the top is swung up the said side will open down and allow of the ready removal of the bale. After the bale is removed the side and top are secured in their places, the sliding bars brought into place and connected to the pulley-stirrups, and the above-described operation repeated until the baling of the loose substance is complete.

It will be readily seen that a baling-press constructed in the manner described can be easily transported from place to place, and admits of the hay, straw, or other similar substance being baled in the field from the stack, and thereby lessens the cost and time of hauling, and also saves the waste occasioned by frequent handling.

Having now fully described my invention, what I claim as new, and desire to secure by Letters Patent, is—

In a baling-press, the horizontally-operating follower M, having connected thereto the sliding and adjustable bars L, in combination with the stirrups K, carrying pulleys $h$, and the rope $g$, connected to means, substantially as shown, for operating the follower, as set forth.

In testimony that I claim the above I have hereunto subscribed my name in the presence of two witnesses.

EPHRAIM B. CUNNINGHAM.

Witnesses:
A. T. COTTRELL,
S. B. HINES.